US011815597B2

(12) United States Patent
Yamanouchi et al.

(10) Patent No.: US 11,815,597 B2
(45) Date of Patent: Nov. 14, 2023

(54) SYSTEMS AND METHODS FOR DETERMINING CONTENTS OF A BELONGINGS INSPECTION BASED ON A SIGNAL

(71) Applicant: NEC Corporation, Tokyo (JP)

(72) Inventors: Shingo Yamanouchi, Tokyo (JP); Shinichi Morimoto, Tokyo (JP); Kazumine Ogura, Tokyo (JP); Tatsuya Sumiya, Tokyo (JP); Masaru Eto, Tokyo (JP); Toshiyuki Nomura, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/692,435

(22) Filed: Mar. 11, 2022

(65) Prior Publication Data

US 2022/0299637 A1 Sep. 22, 2022

(30) Foreign Application Priority Data

Mar. 19, 2021 (JP) .................................. 2021-045899

(51) Int. Cl.
   *G01S 17/04* (2020.01)
   *G06F 21/31* (2013.01)
   *G01N 23/10* (2018.01)
(52) U.S. Cl.
   CPC .............. *G01S 17/04* (2020.01); *G01N 23/10* (2013.01); *G06F 21/31* (2013.01)

(58) Field of Classification Search
   CPC .... G01S 17/04; G01S 7/52036; G01S 13/867; G01S 13/88; G01S 13/887; G01S 7/415; G01S 13/56; G01N 23/10; G06F 21/31; G06F 16/583; G06F 16/9535
   See application file for complete search history.

(56) References Cited

U.S. PATENT DOCUMENTS

2017/0365118 A1* 12/2017 Nurbegovic ......... G01V 5/0008
2020/0011986 A1* 1/2020 Yamanouchi ........... G01S 13/42
2021/0312201 A1* 10/2021 Hastings ................ G01V 3/165

FOREIGN PATENT DOCUMENTS

JP        2019-007771 A       1/2019

* cited by examiner

*Primary Examiner* — Jennifer D Bennett
*Assistant Examiner* — Erin R Garber
(74) *Attorney, Agent, or Firm* — Sughrue Mion, PLLC

(57) ABSTRACT

To shorten a waiting time for a belongings inspection, the present invention provides an inspection system 10 including an acquisition unit 11 that acquires personal unique information unique to each of inspection target persons, and a determination unit 12 that determines a content of a belongings inspection based on a signal of a reflection wave of an electromagnetic wave having a wavelength of equal to or more than 30 micrometers and equal to or less than one meter for the each inspection target person, based on the personal unique information.

10 Claims, 15 Drawing Sheets

FIG. 5

GROUP DEFINITION

| GROUP NUMBER | DEFINITION |
|---|---|
| 001 | POLICE OFFICER |
| 002 | CLEANING STAFF |
| 003 | SECURITY GUARD |
| 004 | FACILITY STAFF |
| 005 | OTHERS |

FIG. 6

INFORMATION FOR EACH GROUP

| GROUP NUMBER | PRESENCE OR ABSENCE OF BELONGINGS INSPECTION |
|---|---|
| 001 | ABSENCE |
| 002 | PRESENCE |
| ⋮ | ⋮ |

FIG. 7

INFORMATION FOR EACH GROUP

| GROUP NUMBER | DETECTION TARGET OBJECT |
|---|---|
| 001 | CAMERA, SMARTPHONE, ··· |
| 002 | KNIFE, GUN, CAMERA, SMARTPHONE, ··· |
| ⋮ | ⋮ |

FIG. 9

INFORMATION FOR EACH PERSON

| TARGET PERSON IDENTIFICATION INFORMATION | PRESENCE OR ABSENCE OF BELONGINGS INSPECTION |
|---|---|
| P013272 | PRESENCE |
| P111989 | ABSENCE |
| ⋮ | ⋮ |

FIG. 10

INFORMATION FOR EACH PERSON

| TARGET PERSON IDENTIFICATION INFORMATION | DETECTION TARGET OBJECT |
|---|---|
| P013272 | CAMERA, SMARTPHONE, · · · |
| P111989 | KNIFE, GUN, CAMERA, SMARTPHONE, · · · |
| ⋮ | ⋮ |

FIG. 12

INFORMATION FOR EACH GROUP

| GROUP NUMBER | KIND OF INSPECTION |
|---|---|
| 001 | BODY TEMPERATURE INSPECTION |
| 002 | BODY TEMPERATURE INSPECTION, BELONGINGS INSPECTION BY ELECTROMAGNETIC WAVE, · · · |
| ⋮ | ⋮ |

FIG. 13

INFORMATION FOR EACH PERSON

| TARGET PERSON IDENTIFICATION INFORMATION | KIND OF INSPECTION |
|---|---|
| P013272 | BODY TEMPERATURE INSPECTION |
| P111989 | BODY TEMPERATURE INSPECTION, BELONGINGS INSPECTION BY ELECTROMAGNETIC WAVE, · · · |
| ⋮ | ⋮ |

SYSTEMS AND METHODS FOR DETERMINING CONTENTS OF A BELONGINGS INSPECTION BASED ON A SIGNAL

TECHNICAL FIELD

The present invention relates to an inspection system and an inspection method.

BACKGROUND ART

Patent Document 1 (Japanese Patent Application Publication No. 2019-7771) discloses an attached matter inspection method. In the attached matter inspection method, attached matter and vapor thereof attached to a subject and an inspection target object carried by the subject are recovered, recovered substance is analyzed by ionization, and an inspection is performed as to whether the attached matter is a hazardous material by collating a result of the analysis with a database.

Further, in the attached matter inspection method, personal information of a subject is acquired, a risk of terrorism of the subject is computed based on the acquired personal information, and an inspection condition and/or a determination condition is changed for each subject in such a way that a true positive rate of an inspection changes according to a level of the computed risk of terrorism.

DISCLOSURE OF THE INVENTION

For ensuring safety and the like, a belongings inspection is performed in various places. In a belongings inspection, shortening a waiting time is expected. An object of the present invention is to shorten a waiting time for a belongings inspection by a method that is not available conventionally.

The present invention provides an inspection system including:
  an acquisition means for acquiring personal unique information unique to each of inspection target persons; and
  a determination means for determining a content of a belongings inspection based on a signal of a reflection wave of an electromagnetic wave having a wavelength of equal to or more than 30 micrometers and equal to or less than one meter for the each inspection target person, based on the personal unique information.

Further, the present invention provides an inspection method including:
  by a computer,
  acquiring personal unique information unique to each of inspection target persons; and
  determining a content of a belongings inspection based on a signal of a reflection wave of an electromagnetic wave having a wavelength of equal to or more than 30 micrometers and equal to or less than one meter for the each inspection target person, based on the personal unique information.

According to the present invention, it is possible to shorten a waiting time for a belongings inspection.

BRIEF DESCRIPTION OF THE DRAWINGS

FIG. 5 is a diagram schematically illustrating one example of information to be processed by the inspection system according to the present example embodiment.

FIG. 6 is a diagram schematically illustrating one example of information to be processed by the inspection system according to the present example embodiment.

FIG. 7 is a diagram schematically illustrating one example of information to be processed by the inspection system according to the present example embodiment.

FIG. 9 is a diagram schematically illustrating one example of information to be processed by the inspection system according to the present example embodiment.

FIG. 10 is a diagram schematically illustrating one example of information to be processed by the inspection system according to the present example embodiment.

FIG. 12 is a diagram schematically illustrating one example of information to be processed by the inspection system according to the present example embodiment.

FIG. 13 is a diagram schematically illustrating one example of information to be processed by the inspection system according to the present example embodiment.

DESCRIPTION OF EMBODIMENTS

In the following, example embodiments according to the present invention are described by using the drawings. Note that, in every drawing, a similar component is designated with a similar reference sign, and description thereof is omitted as necessary.

First Example Embodiment

"Overview"

Figure 1:
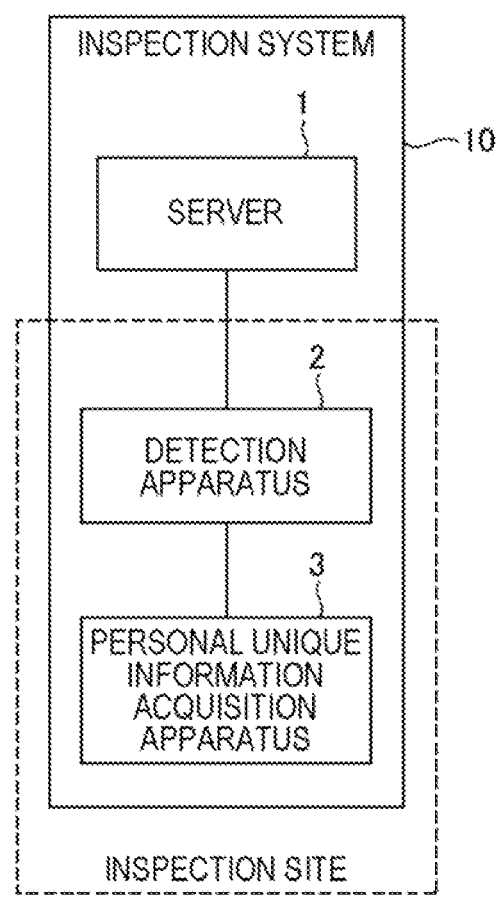
FIG. 1 is a diagram illustrating a configuration example of an inspection system according to the present example embodiment.

As illustrated in FIG. 1, an inspection system 10 according to the present example embodiment includes a server 1, a detection apparatus 2, and a personal unique information acquisition apparatus 3. The detection apparatus 2 and the personal unique information acquisition apparatus 3 are installed in any facility where a belongings inspection is necessary. As the facility, a building, an office, an amusement facility, an airport, a station, and the like are exemplified, but the facility is not limited thereto. Note that, an installation location of the server 1 is not specifically limited.

The detection apparatus 2 performs processing of detecting a detection target object from an inspection target person, based on a signal of a reflection wave of an electromagnetic wave having a wavelength of equal to or more than 30 micrometers and equal to or less than one meter. The personal unique information acquisition apparatus 3 acquires, from an inspection target person before the above-described processing by the detection apparatus 2 is performed, personal unique information unique to the inspection target person. The server 1 determines a content of a belongings inspection for each inspection target person, based on personal unique information. For example, the server 1 determines whether a belongings inspection is to be performed, a kind of a target object to be detected, and the like for each inspection target person, based on personal unique information. Further, the server 1 performs predetermined processing in such a way that a belongings inspection for each inspection target person has a determined content.

In the inspection system 10 according to the present example embodiment as described above, it is possible to perform a belongings inspection of a content suitable for each piece of personal unique information with respect to each of a plurality of inspection target persons. For example, for a person in which necessity of a belongings inspection is low such as a police officer and a child, a belongings inspection may not be performed, or it is possible to reduce the number of kinds of target objects to be detected. On the other hand, for a person in which necessity of a belongings inspection is high, a belongings inspection may be performed, or it is possible to increase the number of kinds of target objects to be detected. In this way, by adjusting a content of an inspection according to necessity of a belongings inspection, a belongings inspection can be made efficient, and a waiting time for an inspection can be shortened.

"Hardware Configuration"

Figure 2:
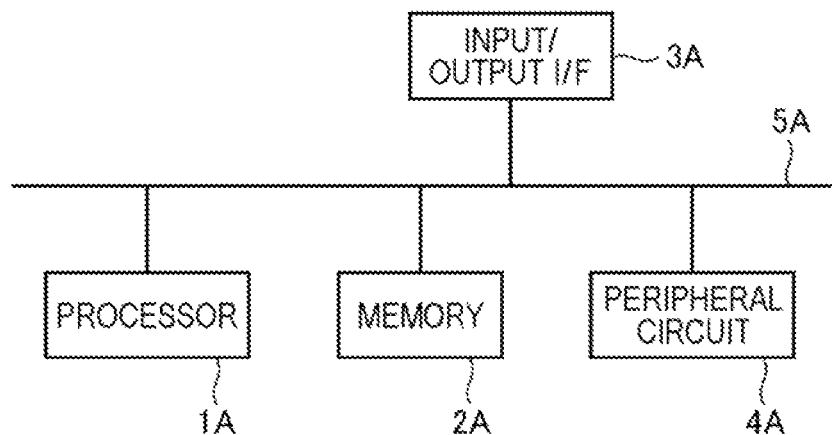
FIG. 2 is a diagram illustrating one example of a hardware configuration of an apparatus according to the present example embodiment.

Next, one example of a hardware configuration of the inspection system 10 is described. FIG. 2 is a diagram illustrating a hardware configuration example of the inspection system 10. Each functional unit included in the inspection system 10 is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus for achieving the configuration.

As illustrated in FIG. 2, the inspection system 10 includes a processor 1A, a memory 2A, an input/output interface 3A, a peripheral circuit 4A, and a bus 5A. The peripheral circuit 4A includes various modules. The inspection system 10 may not include the peripheral circuit 4A. Note that, the inspection system 10 may be constituted of a plurality of apparatuses that are physically and/or logically separated. In a case where the inspection system 10 is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, an electromagnetic wave transmission/reception apparatus, and the like, an interface for outputting information to an output apparatus, an external apparatus, an external server, an electromagnetic wave transmission/reception apparatus, and the like, and the like. The input apparatus is, for example, a keyboard, a mouse, a microphone, and the like. The output apparatus is, for example, a display, a speaker, a printer, a mailer, and the like. The processor 1A can issue a command to each module, and perform an arithmetic operation, based on an arithmetic operation result of each module.

"Functional Configuration"

Figure 3:
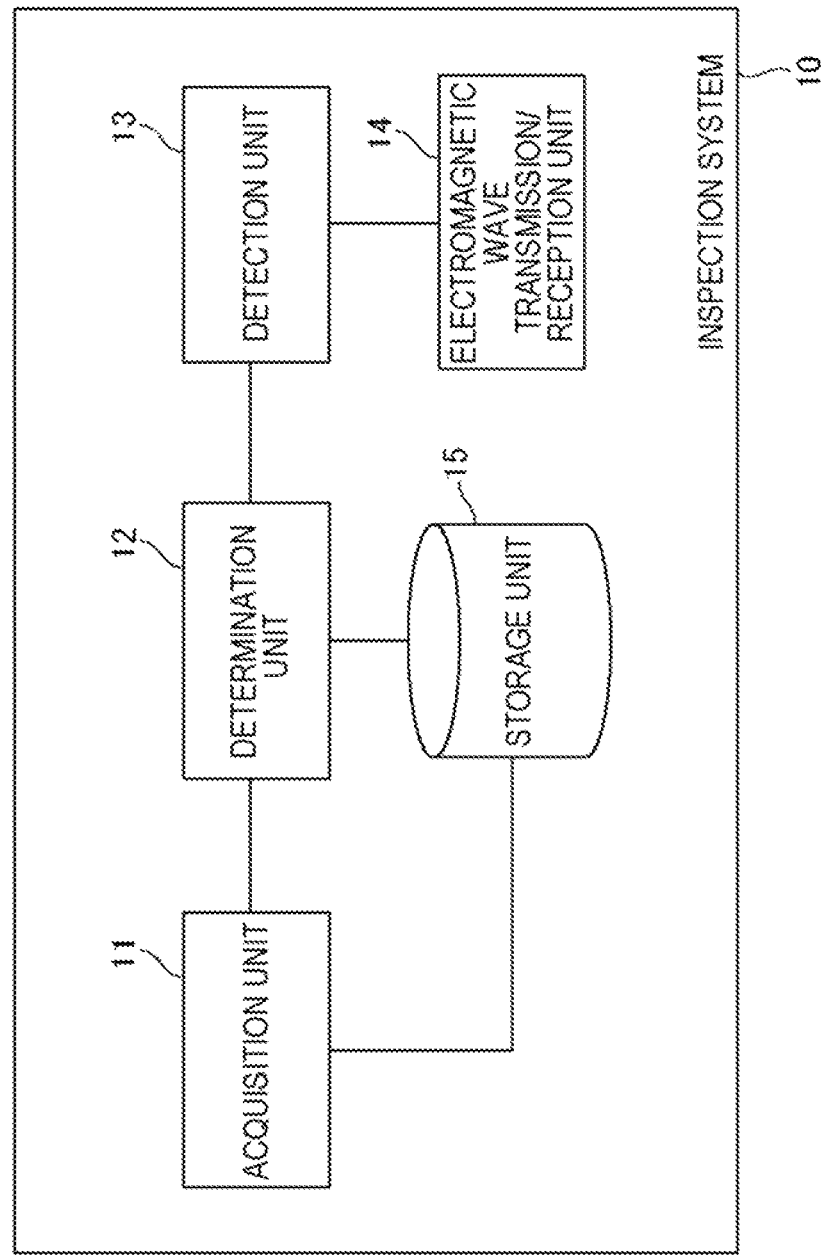
FIG. 3 is a diagram illustrating one example of a functional block diagram of the inspection system according to the present example embodiment.

Next, a functional configuration of the inspection system 10 is described. FIG. 3 illustrates one example of a functional block diagram of the inspection system 10. As illustrated in FIG. 3, the inspection system 10 includes an acquisition unit 11, a determination unit 12, a detection unit 13, an electromagnetic wave transmission/reception unit 14, and a storage unit 15.

These functional units are included in any of the server 1, the detection apparatus 2, and the personal unique information acquisition apparatus 3 in FIG. 1. In which one of these apparatuses, each functional unit is included is not specifically limited, and various patterns can be adopted. For example, the acquisition unit 11 may be achieved by the server 1 and the personal unique information acquisition apparatus 3, the electromagnetic wave transmission/reception unit 14 may be achieved by the detection apparatus 2, the determination unit 12 and the storage unit 15 may be achieved by the server 1, and the detection unit 13 may be achieved by the server 1 or the detection apparatus 2. In the following, a configuration of each functional unit is described.

Figure 4:
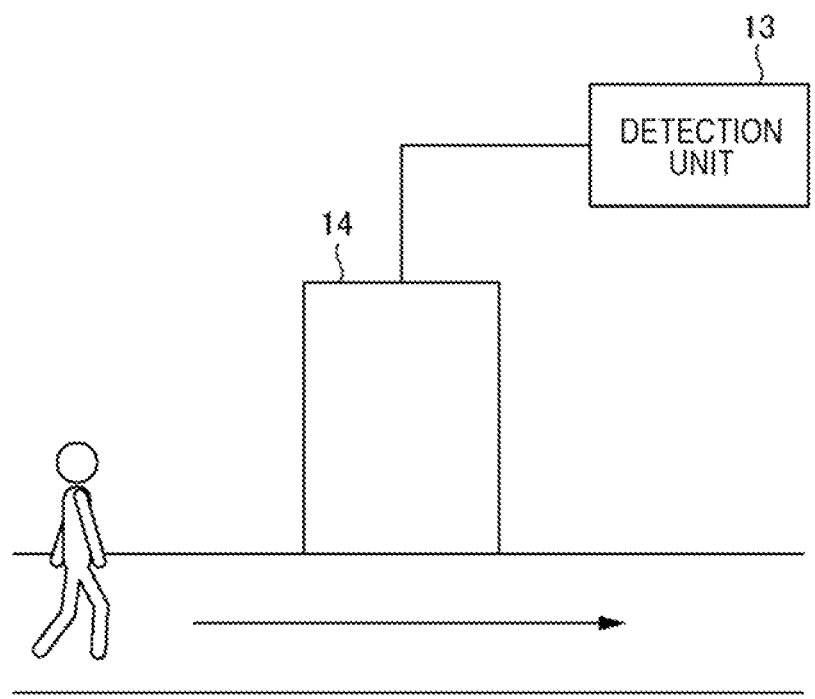
FIG. 4 is a diagram schematically illustrating one example of an electromagnetic wave transmission/reception unit according to the present example embodiment.

The electromagnetic wave transmission/reception unit 14 irradiates an electromagnetic wave (example: a microwave, a millimeter wave, a terahertz wave, and the like) having a wavelength of equal to or more than 30 micrometers and equal to or less than one meter toward an inspection target person present in a predetermined area, and receives a reflection wave. The electromagnetic wave transmission/reception unit 14 is, for example, a radar. The electromagnetic wave transmission/reception unit 14 can be configured by adopting any available technique. For example, as illustrated in an example in FIG. 4, the electromagnetic wave transmission/reception unit 14 may be a sensor panel constituted of a radar in which a plurality of antenna elements are arranged. Note that, the panel is one example, and the electromagnetic wave transmission/reception unit 14 may be constituted of another means such as a gate through which an inspection target person passes, and a booth into which an inspection target person enters.

The detection unit 13 performs detection processing of detecting an anomalous state, based on a signal of a reflection wave received by the electromagnetic wave transmission/reception unit 14. An anomalous state in the present example embodiment is a state in which a person present in a predetermined area carries a detection target object being set in advance. The detection target object is, for example, an object that is prohibited to be carried in, and a gun, a knife, a camera, a plastic bottle, and the like are exemplified, but the detection target object is not limited thereto. In the following, one example of determination processing is described.

First Determination Processing Example

In the example, the detection unit 13 generates a transmission image, based on a signal of a reflection wave received by the electromagnetic wave transmission/reception unit 14. Then, the detection unit 13 detects a detection target object from the transmission image, based on a shape of an object appearing in the transmission image. In a case where a detection target object is detected from the transmission image, it is determined that an inspection target person present in a predetermined area carries the detected detection target object.

By preparation in advance, a feature value of a shape of each of a plurality of objects is generated, and registered in the inspection system 10. The detection unit 13 detects a detection target object from a transmission image, based on a collation result between a feature value of a shape of the detection target object, and a feature value of a shape appearing in the transmission image. These processing by the detection unit 13 may be achieved by using an estimation model generated by machine learning based on training data configured of transmission images and labels of a plurality of objects, or may be achieved by template matching.

Second Determination Processing Example

In the example, the detection unit 13 determines whether an inspection target person present in a predetermined area carries a detection target object, based on a feature value (reflection wave feature value) appearing in a signal of a reflection wave received by the electromagnetic wave transmission/reception unit 14. In a case where a reflection wave feature value unique to a detection target object is detected from a signal of a reflection wave, it is determined that an inspection target person present in a predetermined area carries the detected detection target object.

By preparation in advance, a reflection wave feature value of each of a plurality of objects is generated, and registered in the inspection system 10. The detection unit 13 detects a reflection wave feature value unique to a detection target object from a signal of a reflection wave, based on a collation result between a reflection wave feature value of the detection target object, and a feature value appearing in the signal of the reflection wave. These processing by the detection unit 13 may be achieved by using an estimation model generated by machine learning based on training data configured of signals of reflection waves and labels of a plurality of objects, or may be achieved by template matching.

The detection unit 13 can output a detection result via a predetermined output apparatus (such as a display, a speaker, a warning lamp, and a projection apparatus). The output apparatus may be installed, for example, in an inspection site, and provide predetermined information to a manager managing an inspection target person and an inspection. Further, the detection unit 13 may change an output pattern of an output apparatus according to a content of a detection result (whether a detection target object is detected). There are a variety of output manners, and in the present example embodiment, any available means can be adopted.

The acquisition unit 11 acquires personal unique information unique to each of inspection target persons before an inspection (the above-described inspection to be achieved by the detection unit 13 and the electromagnetic wave transmission/reception unit 14) for an inspection target person is performed. Personal unique information in the present example embodiment is information indicating a group to which each of inspection target persons belongs.

A group is defined by using at least one of an occupation, an affiliation in a predetermined organization, a gender, an age group, and presence or absence of data registration in advance. For example, "a group of persons of 10 years old or younger", "a group of police officers", "a group of security guards", "a group of cleaning staff", "a group of women in a department A", "a group of men in a department A", "a group of directors", "a group of body guards", "a group of persons who are not registered in a database", and the like are exemplified, but the group is not limited thereto.

The acquisition unit 11 acquires at least one of target person identification information for identifying a plurality of inspection target persons from one another, information concerning belongings carried by an inspection target person, information concerning clothes of an inspection target person, and an attribute of an inspection target person estimated from an image, and determines a group to which an inspection target person belongs, based on the acquired information. In the following, one example is described.

First Group Determination Processing Example

In the example, target person identification information is attached in advance to each of a plurality of persons, and association information in which target person identification information and a group to which each inspection target person belongs are associated with each other is stored in the storage unit 15.

Then, the acquisition unit 11 acquires target person identification information from each of inspection target persons. As far as target person identification information can identify a plurality of persons from one another, any available technique can be adopted. For example, target person identification information may be characteristic information attached to each person, such as face information (a face image, a feature value of an external appearance to be extracted from a face image, and the like), fingerprint information, voiceprint information, iris information, and gait information. In addition to the above, target person identification information may be information generated for each person, such as information in which numbers, characters, and the like are arranged.

In a case where target person identification information is face information, iris information, gait information, or the like, the acquisition unit 11 is configured by including an imaging apparatus such as a camera. Further, in a case where target person identification information is fingerprint information, the acquisition unit 11 is configured by including a fingerprint sensor (fingerprint reading apparatus). Further, in a case where target person identification information is a voiceprint, the acquisition unit 11 is configured by including a microphone. Further, in a case where target person identification information is information in which numbers, characters, and the like are arranged, the acquisition unit 11 is configured by including an input apparatus such as a near field communicator, a code reader, a touch panel, a keyboard, a physical button, a microphone, and a camera.

In the example, the acquisition unit 11 determines a group to which each inspection target person belongs, based on target person identification information acquired from each inspection target person, and association information stored in the storage unit 15.

Note that, an inspection target person who does not have target person identification information may be determined to belong to "a group of persons who are not registered in a database".

Second Group Determination Processing Example

In the example, the acquisition unit 11 is configured by including an imaging apparatus such as a camera. The acquisition unit 11 analyzes an image including an inspection target person, and acquires at least either one of information concerning belongings carried by the inspection target person, and information concerning clothes of the inspection target person. Then, the acquisition unit 11 estimates an occupation, an affiliation in a predetermined organization, and the like of the inspection target person, based on these pieces of information. Specifically, an occupation, an affiliation in a predetermined organization, and the like of the person are estimated based on a uniform, a batch, belongings, and the like.

A feature value of belongings and clothes unique to each of an occupation, an affiliation in a predetermined organization, and the like is stored in advance in the storage unit 15 for each of an occupation, an affiliation in a predetermined organization, and the like. The acquisition unit 11 analyzes an image acquired by capturing an inspection target person, and estimates an occupation, an affiliation in a predetermined organization, and the like of the inspection target person by detecting these feature values.

Third Group Determination Processing Example

In the example, the acquisition unit 11 is configured by including an imaging apparatus such as a camera. The acquisition unit 11 analyzes an image including an inspection target person, and estimates an attribute of the inspection target person. Then, the acquisition unit 11 determines a group to which the inspection target person belongs, based on the estimated attribute. An attribute to be estimated is an age group, a gender, and the like. Since a technique for estimating these attributes by an image analysis is widely known, description thereof is omitted herein.

Fourth Group Determination Processing Example

In the example, a group to which an inspection target person belongs is determined by combining two or more of the first to third group determination processing examples.

The determination unit 12 determines a content of a belongings inspection for each inspection target person, based on personal unique information acquired by the acquisition unit 11. In the following, one example is described.

First Content Determination Example

In the example, the determination unit 12 determines whether a belongings inspection is to be performed for each inspection target person, based on personal unique information. For example, a group is defined as illustrated in FIG. 5, and it is defined whether a belongings inspection is to be performed for each group as illustrated in FIG. 6. Information illustrated in FIGS. 5 and 6 is stored in the storage unit 15.

As illustrated in FIG. 6, the determination unit 12 determines whether a belongings inspection is to be performed for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 can output a determined content, specifically, whether a belongings inspection is to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

By doing so, an inspection target person for whom it is determined not to perform a belongings inspection can pass the inspection site without passing a location (in front of a panel, a gate, a booth, and the like) where an electromagnetic wave is irradiated by the electromagnetic wave transmission/reception unit 14.

Note that, it may be configured in such a way that an inspection target person for whom it is determined not to perform a belongings inspection also passes a location (in front of a panel, a gate, a booth, and the like) where an electromagnetic wave is irradiated by the electromagnetic wave transmission/reception unit 14, but irradiation of an electromagnetic wave, and receiving of a reflection wave is not performed for the inspection target person (control of the electromagnetic wave transmission/reception unit 14). In addition to the above, it may be configured in such a way that an electromagnetic wave is also irradiated onto an inspection target person for whom it is determined not to perform a belongings inspection, and a reflection wave is received, but detection of a detection target object based on a signal of the reflection wave is not performed (control of the detection unit 13). In addition to the above, it may be configured in such a way that detection of a detection target object is also performed with respect to an inspection target person for whom it is determined not to perform a belongings inspection, but warning is not output even when a predetermined detection target object is detected (control of the detection unit 13).

Second Content Determination Example

In the example, the determination unit 12 determines a detection target object to be detected for each inspection target person, based on personal unique information. For example, a group is defined as illustrated in FIG. 5, and a detection target object is defined for each group as illustrated in FIG. 7. Information illustrated in FIGS. 5 and 7 is stored in the storage unit 15.

As illustrated in FIG. 7, the determination unit 12 determines a target object (detection target object) to be detected in a belongings inspection for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 notifies a determined content to the detection unit 13. The detection unit 13 performs processing of detecting a determined detection target object. Specifically, in a case of the above-described first determination processing example, the detection unit 13 detects a detection target object from a transmission image, based on a collation result between a feature value of a shape of a determined detection target object, and a feature value of a shape appearing in the transmission image. Further, in a case of the above-described second determination processing example, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape, or a reflection wave feature value) of a target object that is not determined as a detection target object is eliminated from a collation target.

Third Content Determination Example

In the example, the first content determination example and the second content determination example are combined. Specifically, first, it is determined whether a belongings inspection is to be performed for each inspection target person, based on the first content determination example. Then, a detection target object to be detected is determined for each inspection target person, based on the second content determination example, with respect to an inspection target person for whom it is determined to perform a belongings inspection.

Figure 8:
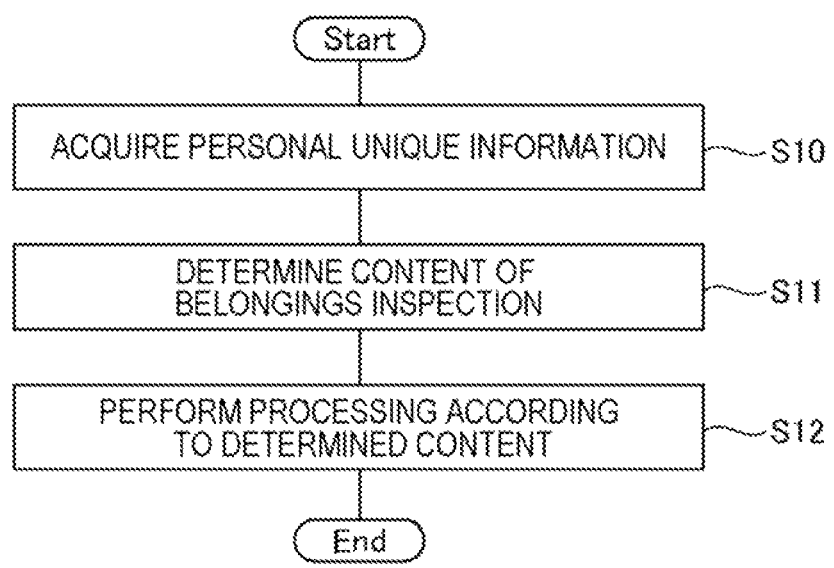
FIG. 8 is a flowchart illustrating one example of a flow of processing of the inspection system according to the present example embodiment.

Next, one example of a flow of processing of the inspection system 10 is described with reference to a flowchart in FIG. 8.

The inspection system 10 acquires personal unique information from an inspection target person before a belongings inspection is performed in an inspection site (S10). For example, the inspection system 10 acquires, as personal unique information, information indicating a group to which the inspection target person belongs. The inspection system 10 can acquire at least one of target person identification information for identifying a plurality of inspection target persons from one another, information concerning belongings carried by an inspection target person, information concerning clothes of an inspection target person, and an attribute of an inspection target person estimated from an image, and determine a group to which an inspection target person belongs, based on the acquired information.

Next, the inspection system 10 determines a content of a belongings inspection based on a signal of a reflection wave of an electromagnetic wave having a wavelength of equal to or more than 30 micrometers and equal to or less than one meter for each inspection target person, based on personal unique information acquired in S10 (S11). For example, the inspection system 10 can determine whether a belongings inspection is to be performed for each inspection target person, based on personal unique information. Further, the inspection system 10 can determine a detection target object to be detected for each inspection target person, based on personal unique information.

Next, the inspection system 10 performs predetermined processing in such a way that a belongings inspection for each inspection target person has a determined content (S12). For example, the inspection system 10 presents a determined content toward a manager managing an inspection target person and an inspection, or controls a processing content of the detection unit 13, the electromagnetic wave transmission/reception unit 14, and the like.

Advantageous Effect

In the inspection system 10 according to the present example embodiment, it is possible to perform a belongings inspection of a content suitable for each piece of personal unique information with respect to each of a plurality of inspection target persons. For example, for a person in which necessity of a belongings inspection is low such as a police officer and a child, a belongings inspection may not be performed, or it is possible to reduce the number of kinds of target objects to be detected. On the other hand, for a person in which necessity of a belongings inspection is high, a belongings inspection may be performed, or it is possible to increase the number of kinds of target objects to be detected.

In this way, by adjusting a content of an inspection according to necessity of a belongings inspection, a belongings inspection can be made efficient, and a waiting time for an inspection can be shortened.

Second Example Embodiment

The present example embodiment is different from the first example embodiment in a point that a content of a belongings inspection is defined for each inspection target person, instead of defining a content of a belongings inspection for each group.

An acquisition unit 11 acquires, as personal unique information, target person identification information described in the first example embodiment.

A determination unit 12 determines a content of a belongings inspection for each inspection target person, based on personal unique information acquired by the acquisition unit 11. In the following, one example is described.

Fourth Content Determination Example

In the example, the determination unit 12 determines whether a belongings inspection is to be performed for each inspection target person, based on personal unique information. For example, as illustrated in FIG. 9, it is defined whether a belongings inspection is to be performed for each piece of target person identification information. Information illustrated in FIG. 9 is stored in a storage unit 15.

As illustrated in FIG. 9, the determination unit 12 determines whether a belongings inspection is to be performed for each inspection target person, based on information for each person in which a content of a belongings inspection is defined in advance for each inspection target person, and personal unique information (target person identification information) acquired by the acquisition unit 11.

Note that, the determination unit 12 can determine a content of a belongings inspection (whether a belongings inspection is to be performed) for an unregistered person that is defined in advance with respect to an inspection target person who does not have target person identification information. Regarding a content of a belongings inspection for an unregistered person, performing a belongings inspection may be defined.

In a case of the example, the determination unit 12 can output a determined content, specifically, whether a belongings inspection is to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

By doing so, an inspection target person for whom it is determined not to perform a belongings inspection can pass the inspection site without passing a location (in front of a panel, a gate, a booth, and the like) where an electromagnetic wave is irradiated by an electromagnetic wave transmission/reception unit 14.

Note that, it may be configured in such a way that an inspection target person for whom it is determined not to perform a belongings inspection also passes a location (in front of a panel, a gate, a booth, and the like) where an electromagnetic wave is irradiated by the electromagnetic wave transmission/reception unit 14, but irradiation of an electromagnetic wave, and receiving of a reflection wave is not performed for the inspection target person (control of the electromagnetic wave transmission/reception unit 14). In addition to the above, it may be configured in such a way that an electromagnetic wave is also irradiated onto an inspection target person for whom it is determined not to perform a belongings inspection, and a reflection wave is received, but detection of a detection target object based on a signal of the reflection wave is not performed (control of the detection unit 13). In addition to the above, it may be configured in such a way that detection of a detection target object is also performed with respect to an inspection target person for whom it is determined not to perform a belongings inspection, but warning is not output even when a predetermined detection target object is detected (control of the detection unit 13).

Fifth Content Determination Example

In the example, the determination unit 12 determines a detection target object to be detected for each inspection target person, based on personal unique information. For example, as illustrated in FIG. 10, a detection target object is defined for each piece of target person identification information. Information illustrated in FIG. 10 is stored in the storage unit 15.

As illustrated in FIG. 10, the determination unit 12 determines a target object (detection target object) to be detected in a belongings inspection for each inspection target person, based on information for each person in which a content of a belongings inspection is defined in advance for each inspection target person, and personal unique information (target person identification information) acquired by the acquisition unit 11.

Note that, the determination unit 12 can determine a content (detection target object) of a belongings inspection for an unregistered person that is defined in advance with respect to an inspection target person who does not have target person identification information.

In a case of the example, the determination unit 12 notifies a determined content to the detection unit 13. The detection unit 13 performs processing of detecting a determined detection target object. Specifically, in a case of the first determination processing example described in the first example embodiment, the detection unit 13 detects a detection target object from a transmission image, based on a collation result between a feature value of a shape of a determined detection target object, and a feature value of a shape appearing in the transmission image. Further, in a case of the second determination processing example described in the first example embodiment, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape or a reflection wave feature value) of a target object that is not determined as a detection target object is eliminated from a collation target.

Sixth Content Determination Example

In the example, the fourth content determination example and the fifth content determination example are combined. Specifically, first, it is determined whether a belongings inspection is to be performed for each inspection target person, based on the fourth content determination example. Then, a detection target object to be detected is determined for each inspection target person, based on the fifth content determination example, with respect to an inspection target person for whom it is determined to perform a belongings inspection.

Other configuration of the inspection system 10 according to the present example embodiment is similar to that of the first example embodiment.

As described above, in the inspection system 10 according to the present example embodiment, an advantageous effect similar to that of the first example embodiment is achieved. Further, in the inspection system 10 according to the present example embodiment, a content of a belongings inspection suitable for each inspection target person is defined, and a belongings inspection having the defined content can be performed. By customizing a content of a belongings inspection depending on a person, it is possible to eliminate waste of inspection. Consequently, a belongings inspection can be made efficient, and a waiting time for an inspection can be shortened.

Third Example Embodiment

Figure 11:
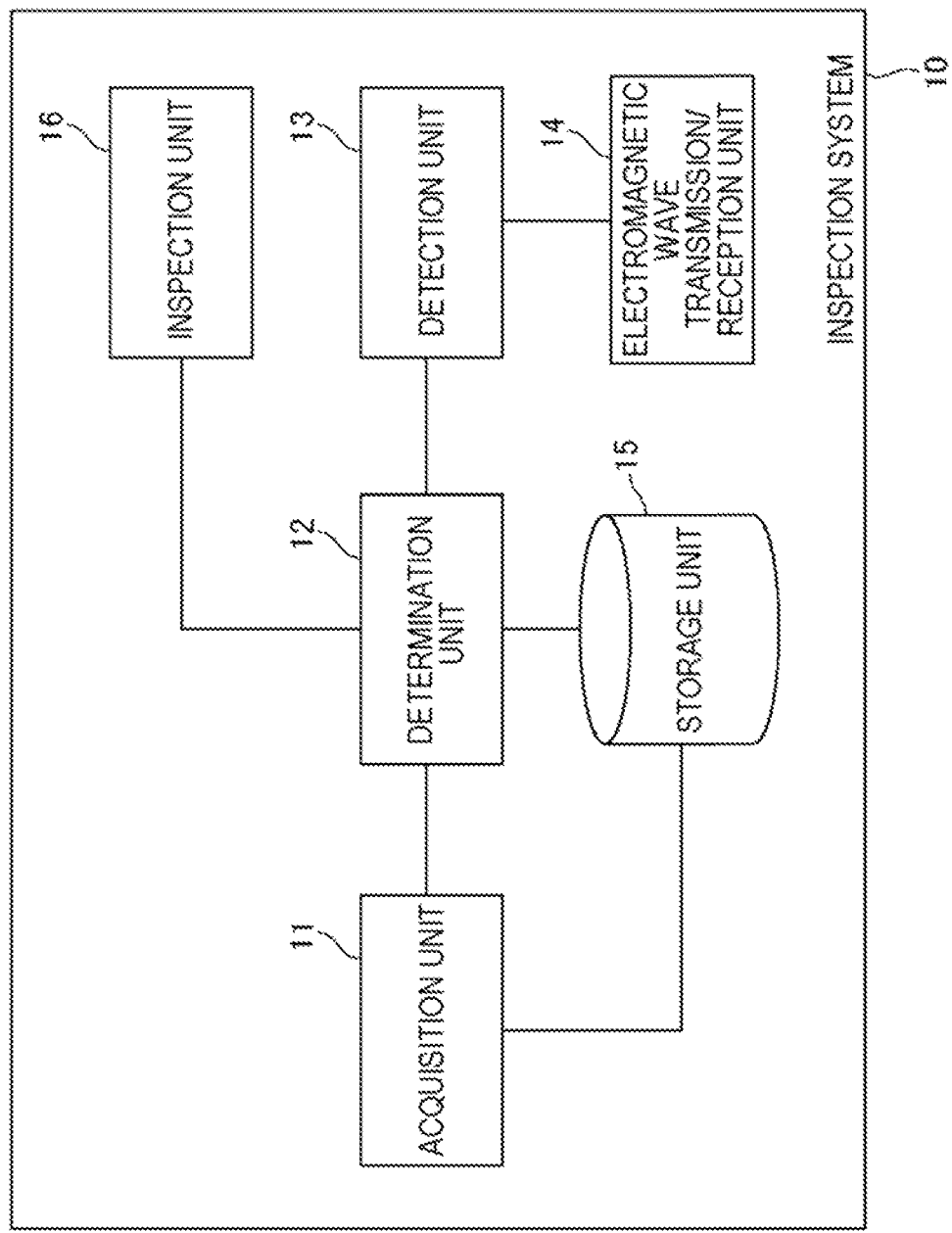
FIG. 11 is a diagram illustrating one example of a functional block diagram of the inspection system according to the present example embodiment.

FIG. 11 illustrates one example of a functional block diagram of an inspection system 10 according to the present example embodiment. The inspection system 10 according to the present example embodiment is different from the inspection system 10 according to the first example embodiment in a point that the inspection system 10 has an inspection unit 16.

The inspection unit 16 performs, for an inspection target person, an inspection other than a belongings inspection (hereinafter, "belongings inspection based on a signal of a reflection wave") based on a signal of a reflection wave of an electromagnetic wave having a wavelength of equal to or more than 30 micrometers and equal to or less than one meter, which is described in the first and second example embodiments. For example, the inspection unit 16 can perform a body temperature inspection in which a body temperature of an inspection target person is measured, a belongings inspection utilizing a metal detector, a belongings inspection utilizing an odor detector, and the like. These inspections can be achieved by adopting any available technique.

The inspection unit 16 can output an inspection result to a predetermined output apparatus (such as a display, a speaker, a warning lamp, and a projection apparatus). The output apparatus may be installed, for example, in an inspection site, and provide predetermined information to a manager managing an inspection target person and an inspection. Further, the inspection unit 16 may change an output pattern of an output apparatus according to a content of an inspection result. There are a variety of output manners, and in the present example embodiment, any available means can be adopted.

A determination unit 12 determines an inspection to be performed from among a plurality of kinds of inspections for each inspection target person, based on personal unique information. The plurality of kinds of inspections include, in addition to a belongings inspection based on a signal of a reflection wave to be achieved by a detection unit 13 and an electromagnetic wave transmission/reception unit 14, the above-described various kinds of inspections to be achieved by the inspection unit 16.

For example, as illustrated in FIG. 12, information for each group in which a kind of inspection to be performed for each group is defined may be stored in a storage unit 15. Further, the determination unit 12 may determine an inspection to be performed from among a plurality of kinds of inspections for each inspection target person, based on the information for each group. A concept of a group, and a means for determining a group to which an inspection target person belongs are as described in the first example embodiment.

In addition to the above, as illustrated in FIG. 13, information for each person in which a kind of inspection to be performed for each inspection target person is defined may be stored in the storage unit 15. Further, the determination unit 12 may determine an inspection to be performed from among a plurality of kinds of inspections for each inspection target person, based on the information for each person.

The determination unit 12 can output a determined content, specifically, information indicating a kind of inspection to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

Other configuration of the inspection system 10 according to the present example embodiment is similar to that of the first and second example embodiments.

As described above, in the inspection system 10 according to the present example embodiment, an advantageous effect similar to that of the first and second example embodiments is achieved. Further, in the inspection system 10 according to the present example embodiment, an inspection suitable for each inspection target person can be performed. By customizing a content of an inspection depending on a person, it is possible to eliminate waste of inspection. Consequently, an inspection can be made efficient, and a waiting time for an inspection can be shortened.

Modification Examples

In the following, modification examples applicable to the first to third example embodiments are described. Also in these modification examples, an advantageous effect similar to that of the first to third example embodiments are achieved.

First Modification Example

Figure 15:
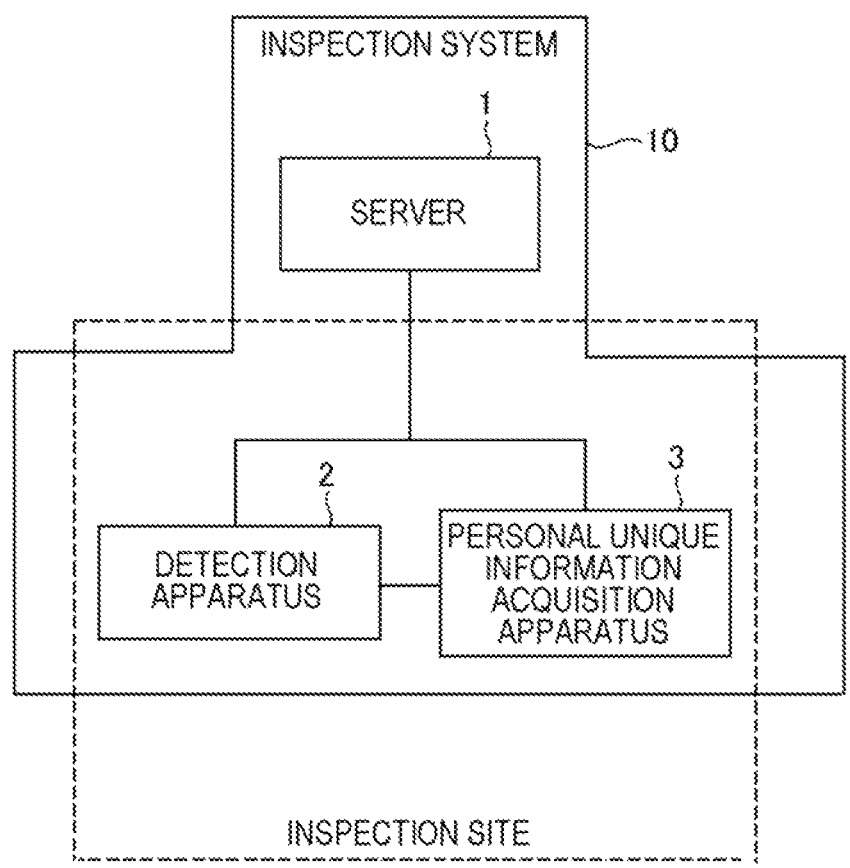
FIG. 15 is a diagram illustrating a configuration example of the inspection system according to the present example embodiment.

In FIG. 1, personal unique information acquired by the personal unique information acquisition apparatus 3 is transmitted to the server 1 via the detection apparatus 2, alternatively, personal unique information acquired by a personal unique information acquisition apparatus 3 may be transmitted to a server 1 without passing through a detection apparatus 2. For example, as illustrated in FIG. 15, the detection apparatus 2 and the personal unique information acquisition apparatus 3 may be connected in parallel to the server 1. Further, for example, an information collecting apparatus for collecting information in an inspection site may be installed in the inspection site. Further, both of the detection apparatus 2 and the personal unique information acquisition apparatus 3 may communicate with the server 1 via the information collecting apparatus.

Second Modification Example

Figure 14:
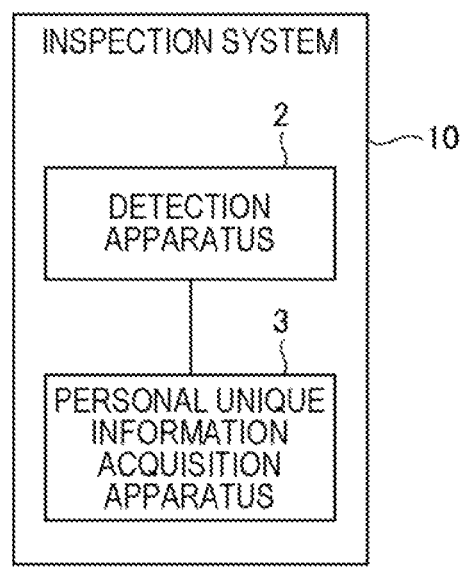
FIG. 14 is a diagram illustrating a configuration example of the inspection system according to the present example embodiment.

As illustrated in FIG. 14, an inspection system 10 may not include the server 1. In this case, an acquisition unit 11, a determination unit 12, a detection unit 13, an electromagnetic wave transmission/reception unit 14, and a storage unit 15 are achieved by the detection apparatus 2 and the personal unique information acquisition apparatus 3 installed in an inspection site. Further, an inspection unit 16 is achieved by a local apparatus installed in the installation site.

Third Modification Example

In the above-described example embodiments, the personal unique information acquisition apparatus 3 acquires, from an inspection target person before detection processing by the detection apparatus 2 is performed, personal unique information unique to the inspection target person. As a modification example, the personal unique information acquisition apparatus 3 may perform acquisition of personal unique information after electromagnetic wave transmission and reception by the detection apparatus 2 is performed, and before detection processing based on a signal of a reflection wave is performed. For example, a case where determination in an inspection is performed by off-line processing, and the like are proposed.

Fourth Modification Example

An anomalous state in the above-described example embodiments is a state in which a person present in a predetermined area carries a detection target object being set in advance. Further, the detection unit 13 detects, from a signal of a reflection wave, anomalous data (feature value of a detection target object) that are not preferable to be included in a signal of a reflection wave.

In the modification example, the detection unit 13 refers to normal data that are preferable to be included, and performs detection processing of detecting an anomalous state (state different from a state indicated by normal data) from a signal of a reflection wave.

Fifth Modification Example

In the above-described example embodiments, a target object that is prohibited to be carried in is set as a detection target object. Further, a state in which a person present in a predetermined area carries a detection target object being set in advance is detected as an anomalous state. In the modification example, a target object that is needed to be carried by a user is set as a detection target object. For example, a batch of a police officer, an article that is obliged to be carried by a person participating in an event, and the like are a detection target object in the modification example. Further, in the modification example, a state in which a person present in a predetermined area does not carry a detection target object being set in advance is detected as an anomalous state. In this case, it is possible to determine whether a secondary inspection is performed on the spot, or a secondary inspection is performed later, based on an attribute of a user in which an anomalous state is detected. The attribute of a user may be an attribute to be estimated from an image, such as a gender and an age, or may be the one other than the above.

Note that, a target object that is prohibited to be carried in may be set as a detection target object A, and a target object that is needed to be carried by a user may be set as a detection target object B. In this case, a detection result is classified into a plurality of cases "a case where a detection target object A is detected, but a detection target object B is not detected", "a case where a detection target object B is detected, but a detection target object A is not detected", "a case where both of a detection target object A and a detection target object B are detected", "a case where neither a detection target object A nor a detection target object B is detected", and the like. It is a design matter to determine which case is detected as an anomalous state.

Note that, in the present specification, "acquisition" includes at least one of "fetching data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "inputting data to be output from another apparatus to an own apparatus (passive acquisition)", based on a user input, or based on a command of a program, for example, receiving data to be distributed (or transmitted, push-notified, or the like), and acquiring by selecting from among received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. An inspection system including:
an acquisition means for acquiring personal unique information unique to each of inspection target persons; and
a determination means for determining a content of a belongings inspection based on a signal of a reflection wave of an electromagnetic wave having a wavelength of equal to or more than 30 micrometers and equal to or less than one meter for the each inspection target person, based on the personal unique information.

2. The inspection system according to supplementary note 1, wherein
the determination means determines whether the belongings inspection is to be performed for the each inspection target person, based on the personal unique information.

3. The inspection system according to supplementary note 1 or 2, wherein
the determination means determines a detection target object to be detected for the each inspection target person, based on the personal unique information.

4. The inspection system according to any one of supplementary notes 1 to 3, wherein
the determination means determines an inspection to be performed from among a plurality of kinds of inspections including the belongings inspection for the each inspection target person, based on the personal unique information.

5. The inspection system according to any one of supplementary notes 1 to 4, wherein
the acquisition means acquires, as the personal unique information, information indicating a group to which the inspection target person belongs, and
the determination means determines a content of the belongings inspection for the each inspection target person, based on information for each group in which a content of the belongings inspection is defined in advance for the each group.

6. The inspection system according to supplementary note 5, wherein
the group is defined by using at least one of an occupation, an affiliation in a predetermined organization, a gender, an age group, and presence or absence of data registration in advance.

7. The inspection system according to supplementary note 5 or 6, wherein the acquisition means acquires at least one of target person identification information for identifying a plurality of the inspection target persons from one another, information concerning belongings carried by the inspection target person, information concerning clothes of the inspection target person, and an attribute of the inspection target person estimated from an image, and determines the group to which the inspection target person belongs, based on the acquired information.

8. The inspection system according to any one of supplementary notes 1 to 4, wherein
the acquisition means acquires, as the personal unique information, target person identification information for identifying a plurality of the inspection target persons from one another, and
the determination means determines a content of the belongings inspection for the each inspection target person, based on information for each person in which a content of the belongings inspection is defined in advance for the each inspection target person.

9. The inspection system according to supplementary note 8, wherein
the determination means determines a content of the belongings inspection for an unregistered person being defined in advance with respect to the inspection target person who does not have the target person identification information.

10. The inspection system according to any one of supplementary notes 1 to 9, further including:
an electromagnetic wave transmission/reception means for irradiating the electromagnetic wave, and receiving a reflection wave; and
a detection means for performing processing of detecting a detection target object, based on a signal of the reflection wave.

11. An inspection method including:
by a computer,
acquiring personal unique information unique to each of inspection target persons; and
determining a content of a belongings inspection based on a signal of a reflection wave of an electromagnetic wave having a wavelength of equal to or more than 30 micrometers and equal to or less than one meter for the each inspection target person, based on the personal unique information.

1 Server
2 Detection apparatus
3 Personal unique information acquisition apparatus
10 Inspection system
11 Acquisition unit
12 Determination unit
13 Detection unit
14 Electromagnetic wave transmission/reception unit
15 Storage unit
16 Inspection unit
1A Processor
2A Memory
3A Input/output interface (I/F)
4A Peripheral circuit
5A Bus

The invention claimed is:
1. An inspection system comprising:
at least one memory configured to store one or more instructions; and
at least one processor configured to execute the one or more instructions to:

acquire personal unique information unique to each of inspection target persons; and determine a content of a belongings inspection based on a signal of a reflection wave of an electromagnetic wave having a wavelength of equal to or more than 30 micrometers and equal to or less than one meter for each of the inspection target persons, based on the personal unique information, acquire, as the personal unique information, information indicating a group to which each of the inspection target persons belongs, store the information for each group which shows, for each group, at least one of whether the belongings inspection is to be performed, and what object is to be detected, determine the group to which each of the inspection target persons belongs, determine, for each of the inspection target persons, the at least one of whether the belongings inspection is to be performed and what object is to be detected, based on the information for each group and the determined group, and determine the content of the belongings inspection for each of the inspection target persons, based on the information for each group in which the content of the belongings inspection is defined in advance for each of the groups, wherein the group is defined based on at least one of an occupation, an affiliation in a predetermined organization, a gender, an age group, and presence or absence of data registration in advance.

2. The inspection system according to claim 1, wherein the at least one processor is further configured to execute the one or more instructions to determine whether the belongings inspection is to be performed for each of the inspection target persons, based on the personal unique information.

3. The inspection system according to claim 1, wherein the at least one processor is further configured to execute the one or more instructions to determine a detection target object to be detected for each of the inspection target persons, based on the personal unique information.

4. The inspection system according to claim 1, wherein the at least one processor is further configured to execute the one or more instructions to determine an inspection to be performed from among a plurality of kinds of inspections including the belongings inspection for each of the inspection target persons, based on the personal unique information.

5. The inspection system according to claim 1, wherein the at least one processor is further configured to execute the one or more instructions to acquire at least one of target person identification information for identifying a plurality of the inspection target persons from one another, information concerning belongings carried by the inspection target person, information concerning clothes of the inspection target person, and an attribute of the inspection target person estimated from an image, and determine the group to which the inspection target person belongs, based on the acquired information.

6. The inspection system according to claim 1, wherein the at least one processor is further configured to execute the one or more instructions to:

acquire, as the personal unique information, target person identification information for identifying a plurality of the inspection target persons from one another, and determine the content of the belongings inspection for each of the inspection target persons, based on the information for each of the inspection target persons defined in advance.

7. The inspection system according to claim 6, wherein the at least one processor is further configured to execute the one or more instructions to determine the content of the belongings inspection for an unregistered person being defined in advance with respect to the inspection target person who does not have the target person identification information.

8. The inspection system according to claim 1, the at least one processor is further configured to execute the one or more instructions to determine:

irradiate the electromagnetic wave, and receive a reflection wave; and perform processing of detecting a detection target object, based on a signal of the reflection wave.

9. The inspection system according to claim 1, wherein a state in which a person present in a predetermined area does not carry a detection target object being set in advance is detected as an anomalous state.

10. An inspection method comprising:

by a computer, acquiring personal unique information unique to each of inspection target persons; and determining a content of a belongings inspection based on a signal of a reflection wave of an electromagnetic wave having a wavelength of equal to or more than 30 micrometers and equal to or less than one meter for each of the inspection target persons, based on the personal unique information, wherein the inspection system:

acquires, as the personal unique information, information indicating a group to which each of the inspection target persons belongs, stores the information for each group which shows, for each group, at least one of whether the belongings inspection is to be performed, and what object is to be detected, determines the group to which each of the inspection target persons belongs, determines, for each of the inspection target persons, the at least one of whether the belongings inspection is to be performed and what object is to be detected, based on the information for each group and the determined group, and determines the content of the belongings inspection for each of the inspection target persons, based on the information for each group in which the content of the belongings inspection is defined in advance for each of the groups, wherein the group is defined based on at least one of an occupation, an affiliation in a predetermined organization, a gender, an age group, and presence or absence of data registration in advance.

* * * * *